United States Patent
Breault et al.

(10) Patent No.: US 10,766,173 B2
(45) Date of Patent: Sep. 8, 2020

(54) METHOD OF MANUFACTURING MULTIPLE FUEL CELL SEPARATOR PLATE ASSEMBLIES

(75) Inventors: Richard Breault, North Kingstown, RI (US); Kishore Kumar Tenneti, Manchester, CT (US); Sridhar V. Kanuri, Milford, CT (US)

(73) Assignee: Audi AG, Ingolstadt (DE)

( * ) Notice: Subject to any disclaimer, the term of this patent is extended or adjusted under 35 U.S.C. 154(b) by 76 days.

(21) Appl. No.: 14/370,468

(22) PCT Filed: Jan. 5, 2012

(86) PCT No.: PCT/US2012/020265
§ 371 (c)(1),
(2), (4) Date: Jul. 2, 2014

(87) PCT Pub. No.: WO2013/103345
PCT Pub. Date: Jul. 11, 2013

(65) Prior Publication Data
US 2014/0338825 A1 Nov. 20, 2014

(51) Int. Cl.
*B29C 48/00* (2019.01)
*B29C 48/12* (2019.01)
(Continued)

(52) U.S. Cl.
CPC ............ *B29C 43/22* (2013.01); *B29C 48/475* (2019.02); *B29C 48/92* (2019.02); *H01M 8/0213* (2013.01);
(Continued)

(58) Field of Classification Search
CPC ..... B29C 47/54; B29C 48/146; B29C 48/475; B29C 48/00; B29C 48/022; B29C 48/03;
(Continued)

(56) References Cited

U.S. PATENT DOCUMENTS

| 3,422,648 A | * | 1/1969 | Lemelson | B21C 23/085 264/171.12 |
| 3,507,939 A | * | 4/1970 | Williams | B29C 48/865 264/40.6 |

(Continued)

FOREIGN PATENT DOCUMENTS

| DE | 102009051434 A1 * | 5/2011 | ............ B29C 48/00 |
| JP | 63-184263 A | 7/1988 | |

(Continued)

OTHER PUBLICATIONS

Levy, S. and J. F. Carley, Plastics Extrusion Technology Handbook, Second Edition, 1989, pp. 12-14.*
(Continued)

*Primary Examiner* — Philip C Tucker
*Assistant Examiner* — Brian R Slawski
(74) *Attorney, Agent, or Firm* — Seed Intellectual Property Law Group LLP

(57) ABSTRACT

A method of manufacturing a flow field plate includes mixing graphite and resin materials to provide a mixture. The mixture is formed into a continuous flow field plate, for example, by ram extrusion or one or more press belts. The continuous flow field plate is separated into discrete flow field plates. Flow field channels are provided in one of the continuous flow field plate and the discrete flow field plates.

15 Claims, 11 Drawing Sheets

(51) Int. Cl.
| | |
|---|---|
| *B29C 48/14* | (2019.01) |
| *B29C 48/87* | (2019.01) |
| *B29C 48/797* | (2019.01) |
| *B29C 65/00* | (2006.01) |
| *B29C 65/48* | (2006.01) |
| *H01M 8/0213* | (2016.01) |
| *H01M 8/0221* | (2016.01) |
| *H01M 8/0226* | (2016.01) |
| *H01M 8/0228* | (2016.01) |
| *B29C 43/22* | (2006.01) |
| *B29C 48/92* | (2019.01) |
| *B29C 48/475* | (2019.01) |
| *B29C 69/00* | (2006.01) |
| *B29C 48/80* | (2019.01) |
| *B29C 48/07* | (2019.01) |
| *B29C 48/875* | (2019.01) |

(52) U.S. Cl.
CPC ....... *H01M 8/0221* (2013.01); *H01M 8/0226* (2013.01); *B29C 48/0022* (2019.02); *B29C 48/022* (2019.02); *B29C 48/07* (2019.02); *B29C 48/797* (2019.02); *B29C 48/832* (2019.02); *B29C 48/875* (2019.02); *B29C 65/482* (2013.01); *B29C 66/43* (2013.01); *B29C 66/73141* (2013.01); *B29C 69/001* (2013.01); *B29C 2793/00* (2013.01); *B29C 2948/92514* (2019.02); *Y02P 70/56* (2015.11)

(58) Field of Classification Search
CPC ....... B29C 48/07; B29C 48/12; B29C 48/797; B29C 48/80; B29C 48/802; B29C 48/82; B29C 48/87; B29C 65/00; B29C 65/48; B29C 65/481; B29C 65/482; B29C 66/00; B29C 66/40; B29C 66/43; B29C 66/73141; H01M 8/0226; H01M 8/0213; H01M 8/0221; H01M 8/0228; H01M 8/0202; Y02P 70/56
USPC ........... 156/60, 242, 244.11, 244.18, 244.22, 156/244.25, 244.27, 250, 256, 264, 272.2, 156/333; 252/511; 264/104, 105, 167, 264/176.1, 177.1, 177.16, 177.17, 177.2; 429/514, 535; 425/113
See application file for complete search history.

(56) References Cited

U.S. PATENT DOCUMENTS

| | | | | |
|---|---|---|---|---|
| 3,774,890 | A * | 11/1973 | Lemelson | B21C 23/085 366/76.92 |
| 5,804,116 | A * | 9/1998 | Schmid | B29C 47/02 264/104 |
| 5,976,432 | A * | 11/1999 | Yang | B01D 39/2055 264/105 |
| 6,165,634 | A * | 12/2000 | Krasij | H01M 8/0284 429/434 |
| 6,210,616 | B1 * | 4/2001 | Suwanda | B29C 47/0019 264/130 |
| 6,270,707 | B1 * | 8/2001 | Hori | B29C 47/0004 264/104 |
| 6,949,305 | B2 | 9/2005 | Terazawa et al. | |
| 7,494,740 | B2 * | 2/2009 | Bonnet | H01M 8/0213 252/511 |
| 2002/0028368 | A1 | 3/2002 | Saito et al. | |
| 2002/0081477 | A1 * | 6/2002 | McLean | H01M 8/0254 429/492 |
| 2002/0110614 | A1 * | 8/2002 | Thielman | B29C 43/222 425/371 |
| 2003/0143452 | A1 * | 7/2003 | Ito | H01M 8/0243 429/520 |
| 2003/0160357 | A1 * | 8/2003 | Gallagher | H01M 8/0267 264/173.1 |
| 2004/0151975 | A1 * | 8/2004 | Allen | H01M 8/026 29/623.1 |
| 2004/0241279 | A1 * | 12/2004 | Smith | B29C 47/0004 425/558 |
| 2005/0042496 | A1 * | 2/2005 | Bisara | H01B 1/24 264/104 |
| 2005/0164070 | A1 * | 7/2005 | Krajewski | B21C 23/22 429/434 |
| 2005/0167873 | A1 * | 8/2005 | Aisenbrey | B29C 70/882 264/113 |
| 2005/0179164 | A1 * | 8/2005 | Globus | B29C 47/00 264/211 |
| 2005/0238941 | A1 | 10/2005 | Nishi et al. | |
| 2005/0242471 | A1 * | 11/2005 | Bhatt | B23K 26/0846 264/400 |
| 2006/0054269 | A1 * | 3/2006 | Nishi | H01M 8/0234 156/73.6 |
| 2008/0292916 | A1 * | 11/2008 | Newman | H01M 8/0202 429/409 |
| 2010/0203359 | A1 * | 8/2010 | Borole | C12N 1/20 429/2 |
| 2010/0307681 | A1 | 12/2010 | Breault et al. | |

FOREIGN PATENT DOCUMENTS

| | | | |
|---|---|---|---|
| JP | 63184263 A * | 7/1988 | .......... H01M 8/0221 |
| JP | 2004-139966 A | 5/2004 | |
| JP | 2006-269313 A | 10/2006 | |

OTHER PUBLICATIONS

Kelly, A.L., et al., "Melt temperature field measurements in extrusion using thermocouple meshes", Plastics, Rubber and Composites, vol. 37, Nos. 2-4, 2008, pp. 151-157.*

Abeykoon et al., "Melt temperature consistency during polymer extrusion," Plastics Research Online, URL= www.4spepro.org/pdf/005245/005245.pdf, 2014, 4 pages.

Cassel, "Determining Percent Solid in a Polymer Blend," TA Instruments Applications Brief TA286, URL= www.tainstruments.com/pdf/literature/TA286.pdf, Apr. 16, 2002, 4 pages.

Cassel, "DSC Tzero™ Technology: An Enhanced Tool for Food Science," TA Instruments Application Brief, URL= www.tainstruments.com/pdf/literature/DSCfoodscience.pdf, Jan. 22, 2002, 3 pages.

* cited by examiner

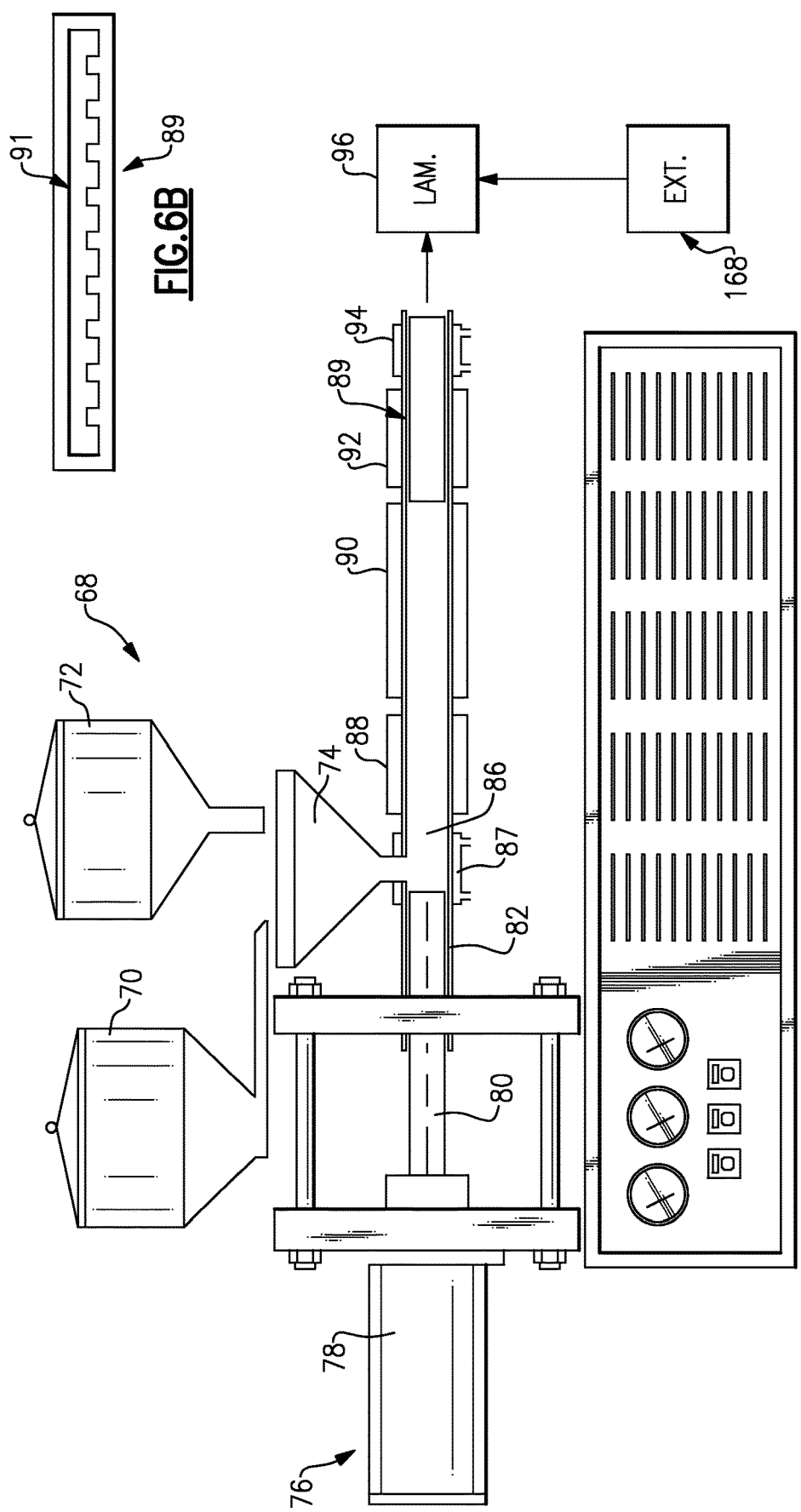

METHOD OF MANUFACTURING MULTIPLE FUEL CELL SEPARATOR PLATE ASSEMBLIES

BACKGROUND

This disclosure relates to fuel cell separator plate assemblies and a method of manufacturing multiple separator plate assemblies and their flow field plates in a continuous, automated process.

A composition for and a manufacturing process to produce a monolithic fuel cell separator plate assembly has been developed, such as disclosed in United States Patent Application Publication No. 2010/0307681 and which is incorporated by reference. Thermally purified flake graphite and fluorinated ethylene propylene (FEP) resins materials, with a typical composition of 15-20% FEP, have been used to make the separator plate assembly. Other hydrophobic resins such as perfluoroalkoxy copolymer (PFA) and polytetrafluoroethylene (PTFE) are also suitable. The resins are available from manufacturers, such as DuPont.

The separator plate assembly is also known as a bi-polar separator plate and contains flow fields on both sides of the separator plate assembly that distribute the reactants within the fuel cell. One example flow field used in UTC Power PC-50 phosphoric acid fuel cells (PAFC) has a platform of 500 mm×500 mm and contains approximately 150 reactant flow channels that are about 1.4 mm wide by 0.7 mm deep for the cathode flow field and 1.4 mm wide by 1.0 mm deep for the anode flow fields. The over-all thickness of the anode flow field and cathode flow field is about 1.7 and 1.4 mm respectively.

Preforms are currently made in a batch process by depositing a powdered mixture of graphite-FEP into the molds. These powders have a bulk density of about 0.6-0.7 g/mL versus the molded density of 2.1-2.2 g/mL. There are several shortcomings to this dry process. It is difficult to achieve a uniform powder distribution across the part. This variation translates to poor uniformity in thickness and density across the part. There is the additional complication when one is trying to mold a flow field to net shape that the compression ratio for the powder over the web of the flow field is different than over the ribs of the flow field. This results in the ribs having a lower density than the web which result in lower thermal and electrical conductivity and higher acid absorption and acid transfer rates which are undesirable. The orientation of the graphite particles in the ribs tends to be more along the ribs than across the ribs which is also less desirable. The typical batch process used in manufacturing is quite expensive.

The separator plate assembly must have a very low electrolyte take-up and very low rate of thru-plane acid transfer over its 10-20 year life. This is the most demanding characteristic of the separator plate assembly. Acid permeates the separator plate assembly from the cathode side to the anode side of the plate due to electrochemical oxidation (corrosion) of the surface of the graphite. Oxidation makes the graphite hydrophilic which results in it being wet by the acid electrolyte.

The thermally purified large flake graphites currently used in separator plate assemblies have two benefits relative to spherical graphites previously used. First, the low ratio of edge planes to basal planes with the large graphite flakes results in a very low corrosion rate compared to spherical graphite. Second, the current manufacturing process also results in the graphite flakes being preferentially aligned perpendicular to the thru-plane direction. This results in a very high tortuosity to thru-plane acid penetration which further impedes acid penetration into the plate.

Thermoplastics such as FEP are formed into tubing, film, sheets and insulating coatings on electrical wiring by using melt extrusion processes. These materials are typically 100% FEP. In some applications a few % fillers are added to color the products or affect their electrical properties. The extruder typically has multiple heating zones. The temperatures of these zones, according to DuPont, are typically 330-370° C. which is significantly higher than the melting point of a typical FEP which is about 260° C. The FEP exits the extruder in a molten, entirely liquid state and at ambient pressure. Various approaches are used to cool the formed article to solidify the FEP and to control the dimensions of the extruded article. FEP tubing, for example, is drawn over a mandrel while immersed in a water bath thus setting the diameter and solidifying the FEP. In one example manufacturing method, FEP film is calendared with chilled rolls to set its thickness and solidify the FEP.

SUMMARY

A method of manufacturing a flow field plate includes mixing graphite and resin materials to provide a mixture. The mixture is formed into a continuous flow field plate, for example, by ram extrusion or a double belt press. The continuous flow field plate is separated into discrete flow field plates. Flow field channels are provided in one of the continuous flow field plate and the discrete flow field plates.

In one example, a ram extrusion process is disclosed for forming flake graphite-FEP flow fields for a PAFC to net shape. The process includes ejecting the flow field plate from the die at a temperature where the FEP resin consists of two-phases; i.e., a liquid and a solid phase. Flow field channels may be formed during or subsequent to the continuous flow field plate forming process. A configuration for a separator plate assembly is disclosed that consists of two flake graphite-FEP flow fields bonded together with a fluoroelastomer.

In another example, a double belt press forming process is disclosed for forming flake graphite-FEP flow fields to net shape by extruding a flake graphite-FEP paste onto a continuous steel belt that contains a channel configuration that is the mirror image of the flow field plate. A double belt press process is also disclosed to form flake graphite-FEP flow field plate blanks.

BRIEF DESCRIPTION OF THE DRAWINGS

The disclosure can be further understood by reference to the following detailed description when considered in connection with the accompanying drawings wherein:

FIG. 6A is a schematic depiction of a ram extrusion machine.

FIG. 6B is a schematic view of a die for the ram extrusion machine of FIG. 6A.

DETAILED DESCRIPTION

Figure 1:
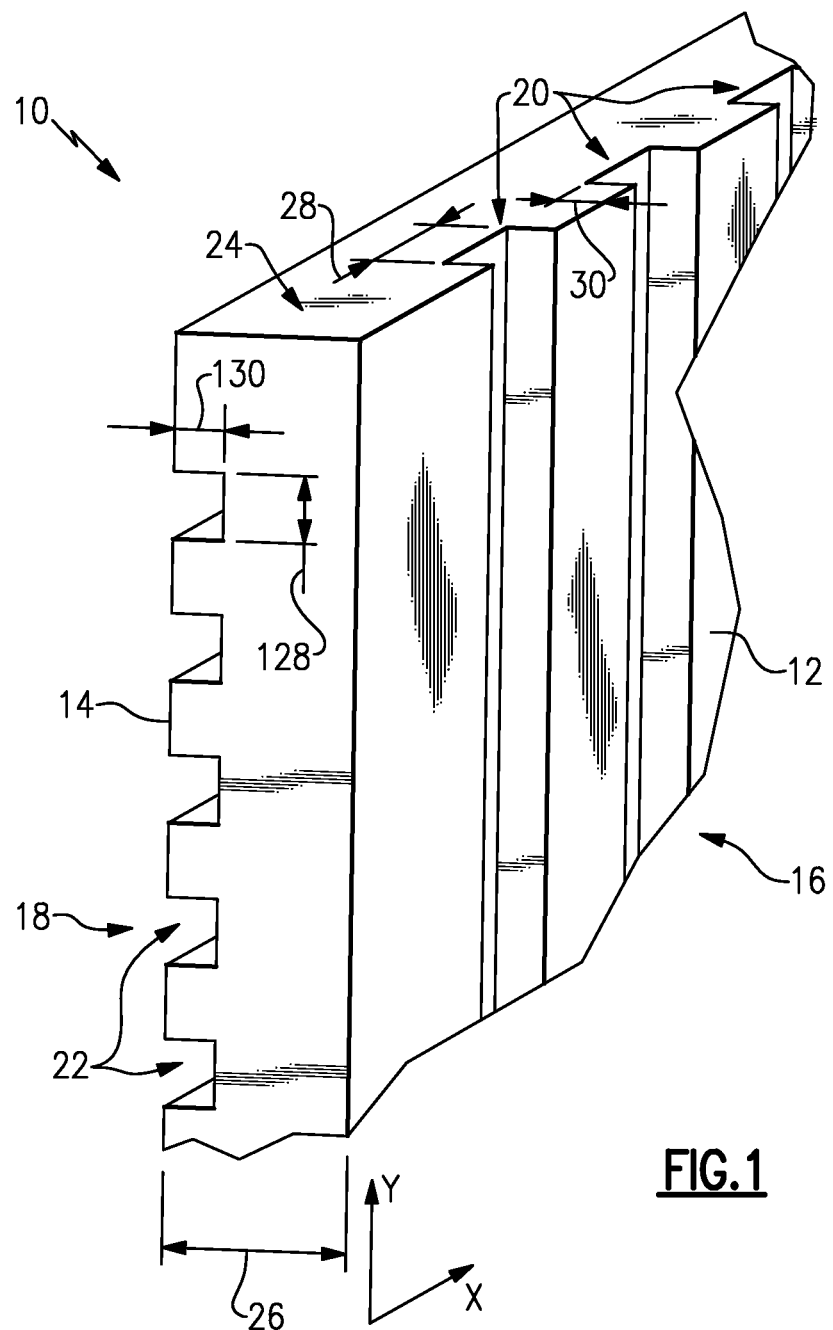
FIG. 1 is a schematic view of a portion of an example fuel cell separator plate.

A fuel cell separator plate 10 is schematically illustrated in FIG. 1. The plate 10 has first and second sides 12, 14 that respectively provided first and second flow fields 16, 18 corresponding to cathode and anode flow fields. The first and second flow fields 16, 18 respectively include first and second flow field channels 20, 22 extending to a perimeter 24 of the plate 10. Each flow field may consist of around 150 channels. The platform (in the X-Y direction) of one typical plate 10, defined by the perimeter 24, is 500 mm×500 mm (19.7 in×19.7 in). The aspect ratio of the width of the flow field plate to its thickness is about 300-350:1 in one example. One of the flow field plates is 1.7 mm thick so its aspect ratio is 500/1.7=294. The other flow field plate is 1.4 mm thick so its aspect ratio is 500/1.4=357. In the illustrated example, the flow field channels are parallel to one another on each side, and the flow field channels on one side are perpendicular to the channels on the opposing side.

The plate 10 has a thickness 26, which is about 3.1 mm in one example. In one example, the first flow field channels 20 have a width 28 of about 1.4 mm (0.06 in) and a depth 30 of about 0.7 mm (0.03 in). The second flow field channels have a width 128 of 1.4 mm (0.06 in) and a depth 130 of 1.0 mm (0.04 in). The overall thickness of the anode flow field and cathode flow fields are about 1.7 and 1.4 mm respectively. The total thickness of the bipolar plate in FIG. 1 in this example is about 3.1 mm. It consists of the depth of the fuel channels (1.0 mm)+the depth of air channels (0.7 mm)+the web thickness (1.4 mm). The web is the thickness between the bottom of the fuel channels to the bottom of the air channels. The plate in FIG. 5B consists of an anode flow field and a cathode flow field. The anode flow field has a fuel channel depth of 1.0 mm and a web thickness of 0.7 mm for a total thickness of 1.7 mm. The cathode flow field an air channel depth of 0.7 mm and a web thickness 0.7 mm for a total thickness of 1.4 mm. The total thickness in FIG. 1 & FIG. 5B is approximately the same 3.1 mm.

Figure 2:
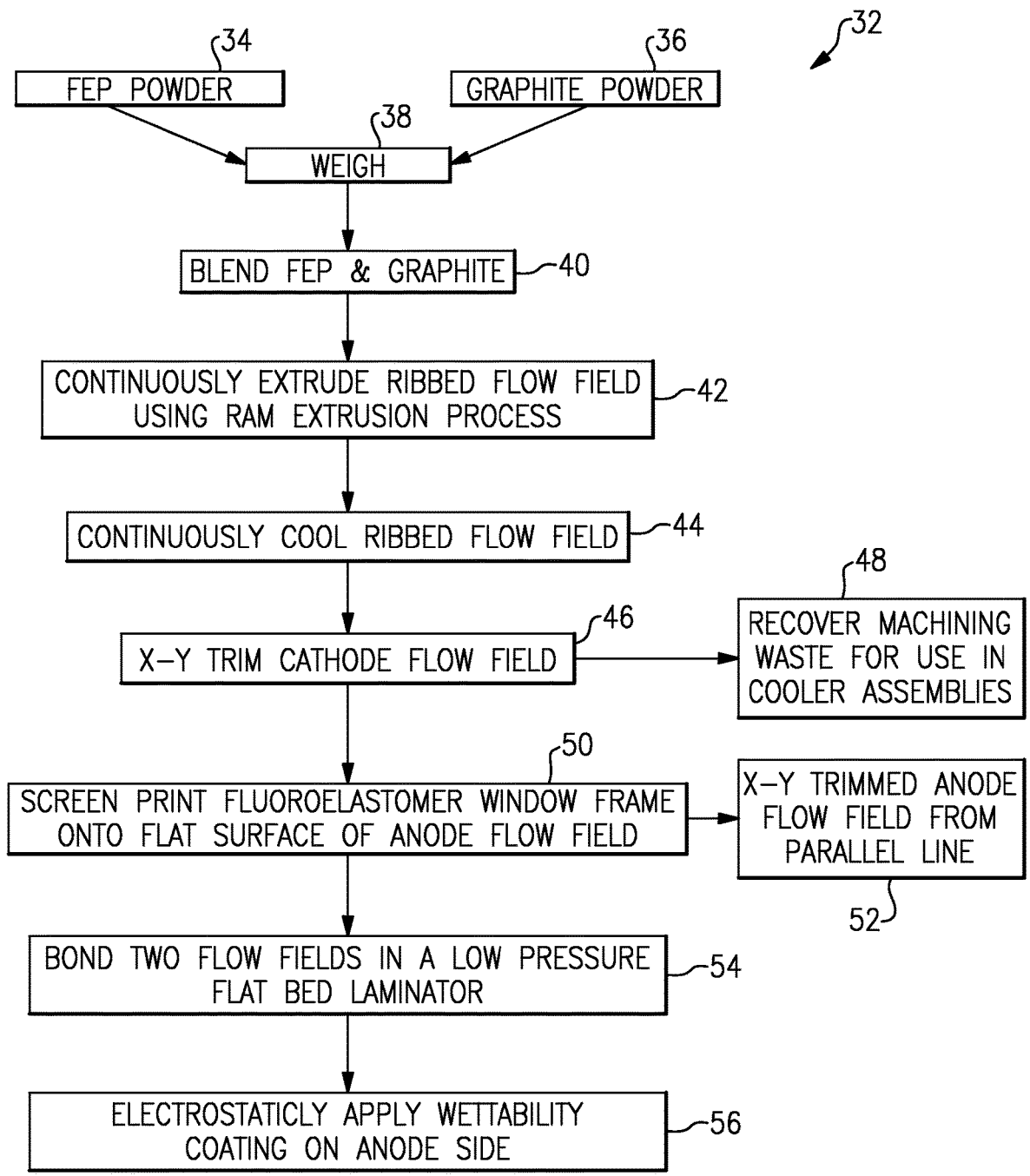
FIG. 2 is flow chart depicting an example process of continuously forming a flow field plate to net shape using ram extrusion.
Figure 3:
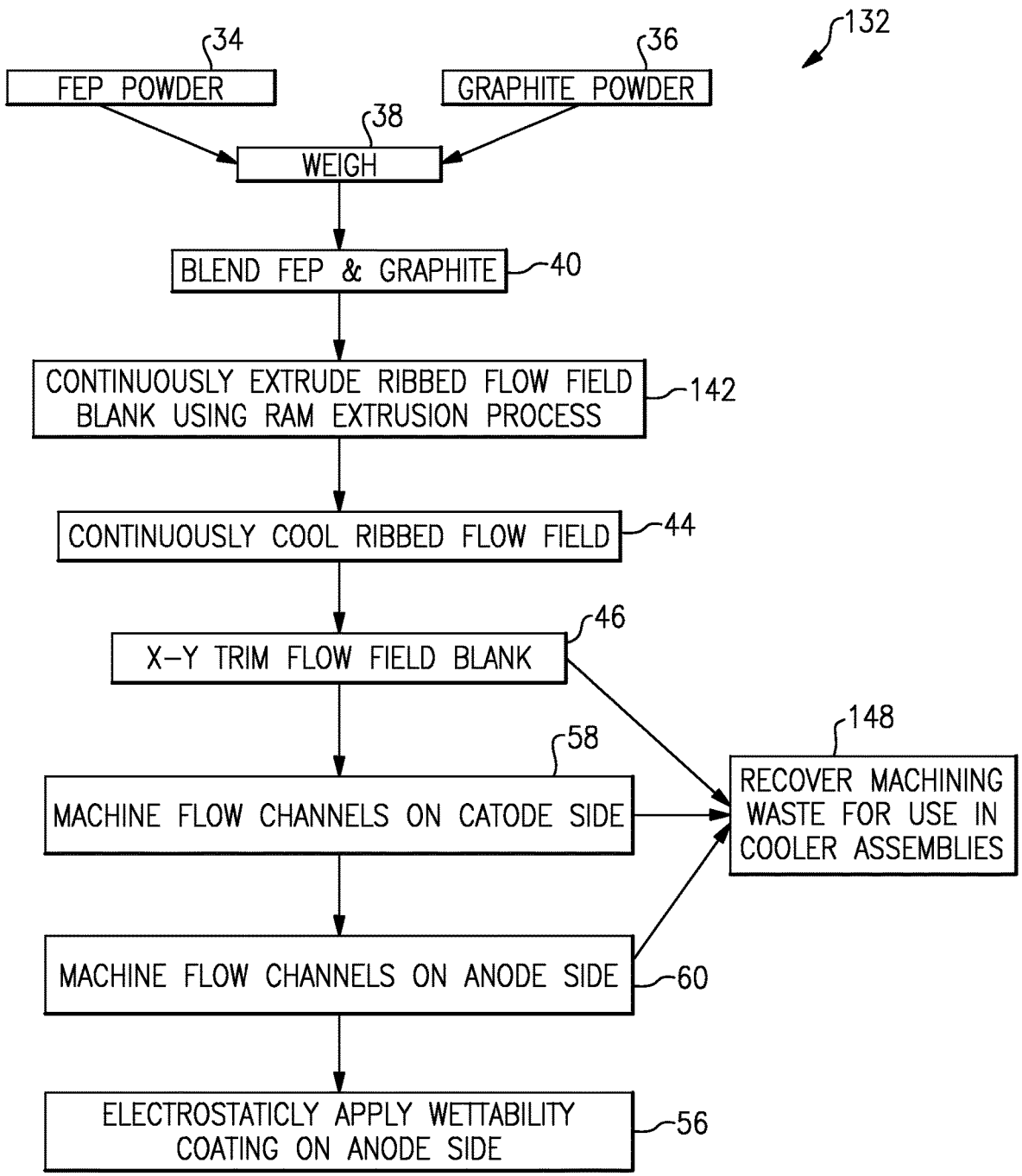
FIG. 3 is a flow chart depicting an example process of continuously forming a bipolar plate blank using ram extrusion.
Figure 5A:
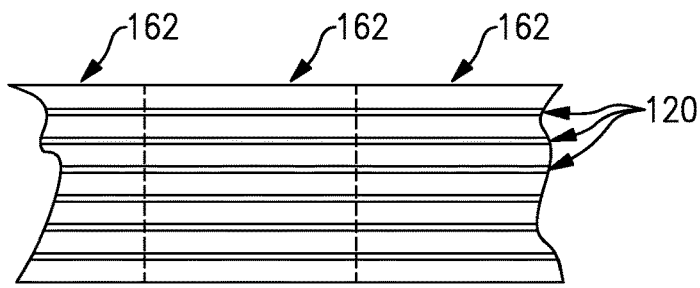
FIG. 5A is an elevational view of a continuous flow field plate manufactured according to the ram extrusion process set forth in FIG. 2.

FIGS. 2 and 3 are process flow charts depicting example manufacturing methods 32, 132 for producing a separator plate assembly (FIGS. 5A and 5B) using a ram extrusion machine (FIGS. 6A and 6B). Two example manufacturing methods 32, 132 are described. FIG. 2 relates to extruding a flow field plate to net shape with the flow field channels formed during the extrusion process. Alternatively, it may be desirable to extrude a flow field blank and machine channels into either side of the blank, as set forth in FIG. 3.

Referring to FIGS. 2 and 3, FEP powder 34 and graphite powder 36, such as flake graphite, are metered and weighed 38 to provide a mixture. Resins other than FEP may be used. The mixture is thoroughly blended 40. As shown in FIG. 2, a flow field plate having a ribbed profile providing channels is continuously extruded, using a ram extrusion process, for example. The continuous flow field plate extrusion is produced as indicated at 42, and schematically depicted in FIG. 5A, including flow field channels 120. The continuous extrusion provides discrete flow field plates 162 (shown by dashed lines) subsequent to trimming, as depicted in 46 of FIG. 2. Alternatively, a blank (i.e., without ribs and channels) may be continuously extruded, as indicated at 142 of FIG. 3. The flow field plate or blank is cooled, as indicated at 44.

Figure 5B:
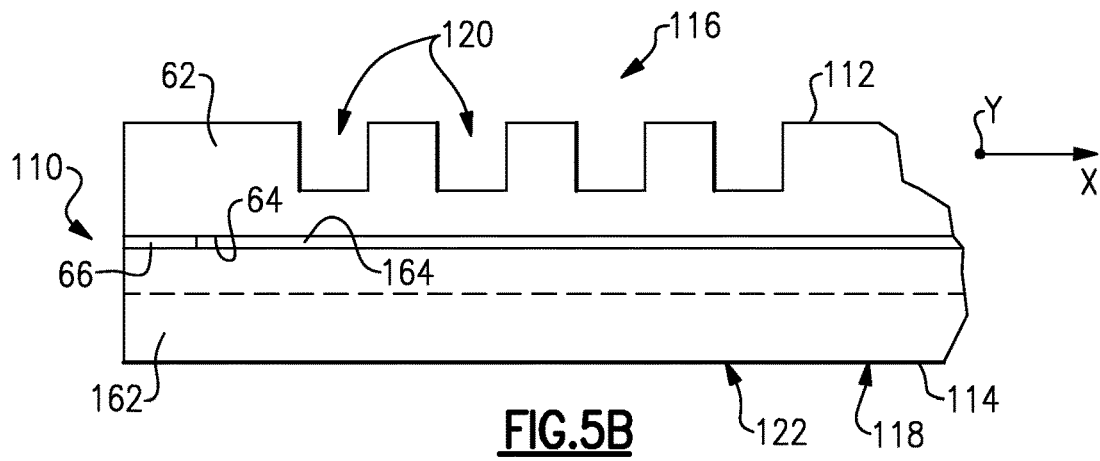
FIG. 5B is a cross-sectional view illustrating two flow field plates bonded to one another.

Returning to FIG. 2 and referring to FIG. 5B, a separator plate 110 is produced by joining trimmed flow field plates from two extrusion lines, although a single extrusion line may be used. As shown in FIG. 5B, a trimmed flow field plate 62 (from one extrusion line, indicated at 46 in FIG. 2), is coated with a fluoroelastomer 66 (as indicated at 50 in FIG. 2) to join the sides 64, 164 of the flow field plates 62, 162 (as indicated by 52 in FIG. 2). In one example, a band of fluoroelastomer 66 is applied near the perimeter of the assembly, like a window frame, to the flat side of one of the flow field plates by known techniques such as spraying or screen printing. The fluoroelastomer 66 creates a gas and liquid seal between the two flow field plates 62, 162 and results in a separator plate assembly 116. The fluoroelastomer may be Fluorolast® WB-200 sold by Lauren Manufacturing with a fluorine content of at least 68 weight percent, for example. A first side 112 of the plate 62 provides a first flow field 116 including first channels 120 of a cathode. The second side 114 of the plate 162 provides a second flow field 118 including second channels 122 of an anode. The two plates 62, 162 are bonded in a low pressure flatbed laminator 54, or by other known laminating means, such as a platen press, (FIG. 2) at 150-200° C. (317-415° F.), for example. Alternatively, the flow fields may be bonded in situ within the PAFC during its initial heat-up cycle. A wettability coating is electrostatically applied to the anode side 114, as indicated at block 56. Alternatively, the wettability coating may be applied by spraying and drying an aqueous suspension of a carbon black onto the flow field as is known. The machining waste is collected and may be used later to produce cooler assemblies, for example, as indicated at 48.

Referring to FIG. 3, after trimming, channels are machined on the cathode and anode sides of the same blank, as indicated respectively at 58 and 60. The machining waste is collected and may be used later to produce cooler assemblies, for example, as indicated at 148. A wettability coating is electrostatically applied to the anode side, as indicated at 56.

FIG. 6A shows a schematic of a horizontal ram extrusion machine 68. Graphite and FEP powder is fed from storage bins 70, 72 into a hopper 74 that feeds powder into a barrel 86 when the ram 80 is extracted. The ram arrangement 76 includes a hydraulic piston 78 with the ram 80 slidably received in a cylinder 82. The ram extrusion machine and process achieves continuous production of a continuous flow field plate from a discontinuous material feed. The mixed powder is compacted when the ram 80 is inserted into the barrel 86. A cooling section 87 is provided near the entrance to the barrel 86 to prevent material entering the barrel 86 from melting earlier than desired. The barrel 86 includes a die 89 having a profile 91 shown in FIG. 6B that provides the width and thickness of the plate. If flow field channels are to be formed during extrusion, the profile 91 also includes channels and ribs.

The mixture is heated as it progresses along the barrel 86 with each stroke of the ram 80 by electrical heating elements 88, 90, 92 attached to the barrel 86 until the mixture reaches a temperature above the melting point of the FEP. The die 89 occupies between ⅓ and ¼ of the length of the extruder and is located at the exit of the extruder. The molten mixture enters the die 89 where it is cooled as is passes through a cooling section 94. The extruded mixture is a two-phase liquid-solid mixture of FEP and solid graphite as discussed below. The graphite flakes in the molten graphite-FEP mixture become orientated perpendicular to the plane of the flow field as the mixture passes through the initial portion of the die 89 as a result of the action of viscous forces on the graphite flakes.

Figure 4:
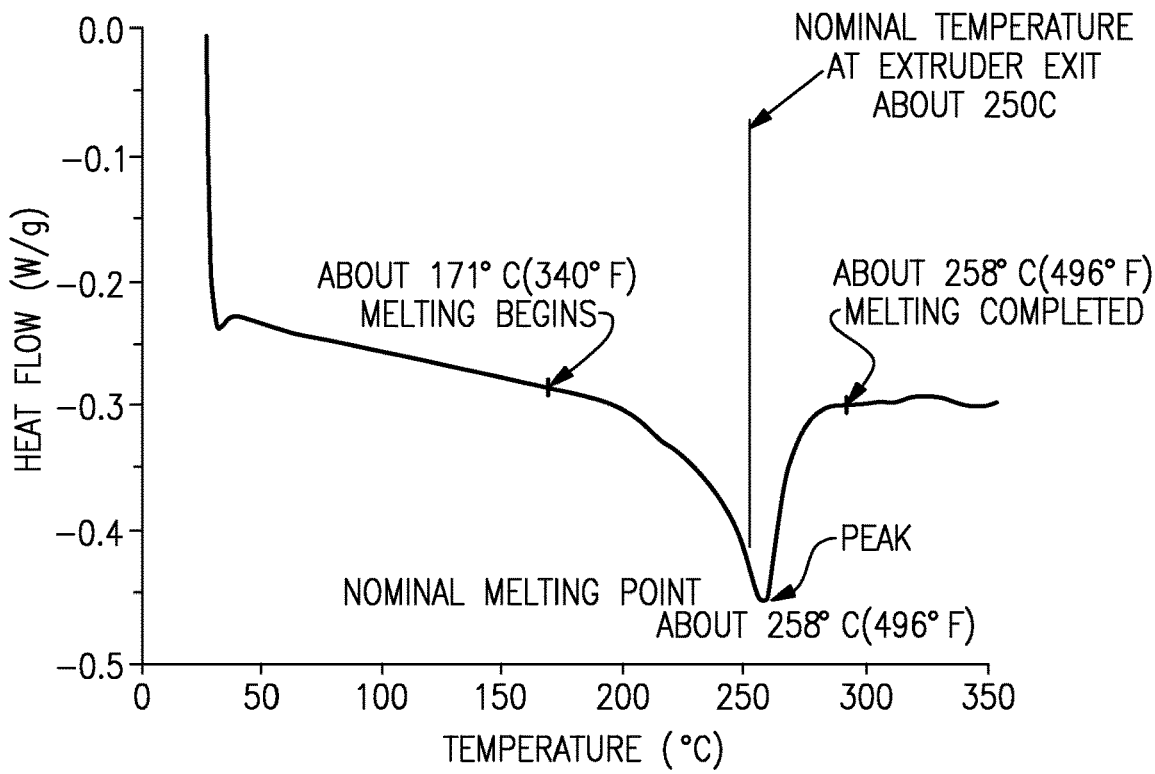
FIG. 4 is a differential scanning calorimeter graph of one example fluorinated ethylene propylene.

The extruded part is ejected from the die 89 at a temperature that is above the temperature where the FEP begins to melt and below which the FEP is completely melted. FIG. 4 is a differential scanning calorimeter (DSC) graph for FEP showing that a thermoplastic polymer such as FEP has a relatively broad melting point. At the peak in the DSC plot the resin exists in two-phases, with half of the FEP resin in the liquid state and half in the solid state. A desired melt-to-solid-resin ratio at the exit of the die 89 is between 40:60 and 60:40 (roughly at 250° C. (482° F.) when the resin is FEP), although other ratios may be used. The liquid state provides lubrication permitting extrusion of the flow field plate at desirable pressures through the die 89 while the solid state bonds the structure together resulting in acceptable physical properties.

Ram extrusion provides FEP resin melted by heaters external to the mold rather than by friction, for example, as would be the case in the screw extrusion process. Thus, ram extrusion, which translates the ram 80 without rotating the ram about its axis, produces much less attrition of the graphite flakes and ultimately results in a flow field with properties similar to those of existing desired separator plate assemblies made by a batch process. Much higher pressures can be developed in the ram extrusion process than in the screw extrusion process. This is useful in extruding the extremely viscous two-phase FEP-graphite composition through the die 89.

Figure 7:
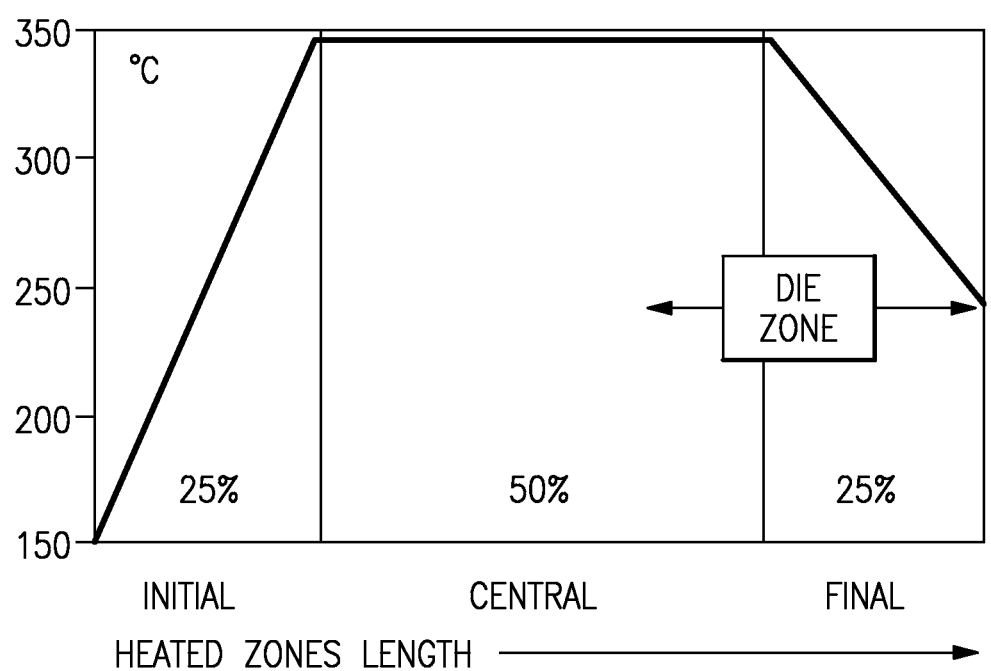
FIG. 7 is a graph depicting the temperature profile of the ram extrusion process set forth in FIGS. 2 and 3.

Referring to FIG. 7, one example temperature profile along the first quarter length of the extruder provides an increasing temperature from 150° C. (302° F.) to 350° C. (662° F.), the next half length of the extruder maintains a flow field temperature of 350° C. (662° F.), and the last quarter length of the extruder decreases the temperature from 350° C. (662° F.) to 250° C. (482° F.). Again, the die 89 occupies ⅓ to ¼ of the length of the extruder in the example. In one example, the temperature of the extruded flow field plate is about 260° C. as it exits the die. This temperature corresponds to approximately 50% of the FEP being liquid and 50% being solid. The extruded flow field plate is passed over a quench table, schematically shown as the cooling section 94, where its temperature is reduced from 250° C. (482° F.) to near-ambient. The quench table may contain a series of rolls to maintain contact between the extruded flow field plate and the quench table to increase the rate of cooling.

The individual flow field plates 62, 162 are formed into a separator plate assembly 110 as previously discussed. As shown in FIG. 6A, extrusion machines 68, 168 may be used to produce the flow field plates 62, 162 using a low pressure continuous flat bed laminator 96. The anode flow field is coated with a wettability treatment as discussed.

Figure 8:
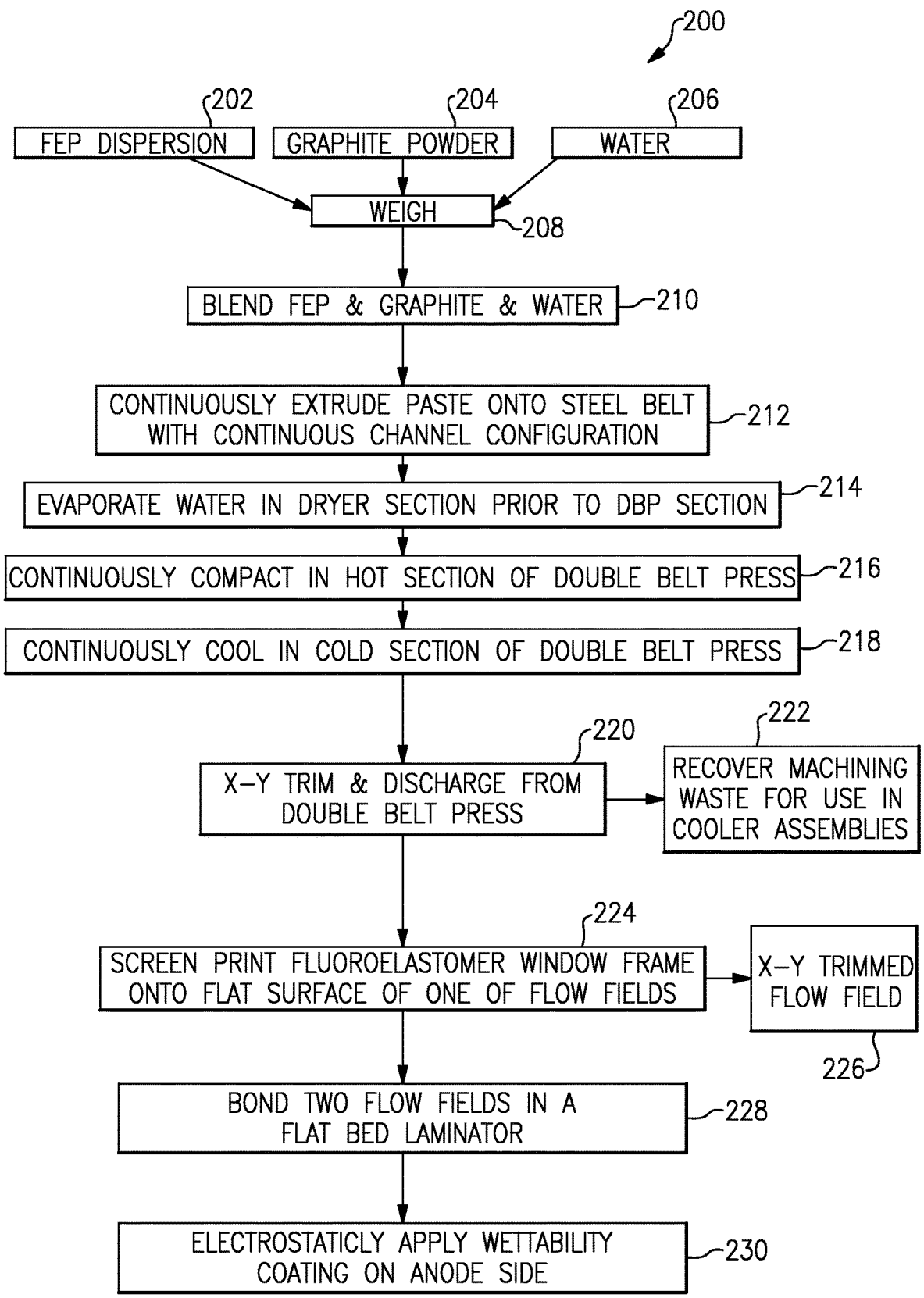
FIG. 8 is flow chart depicting an example process of continuously forming a flow field plate to net shape using a double belt press.
Figure 9:
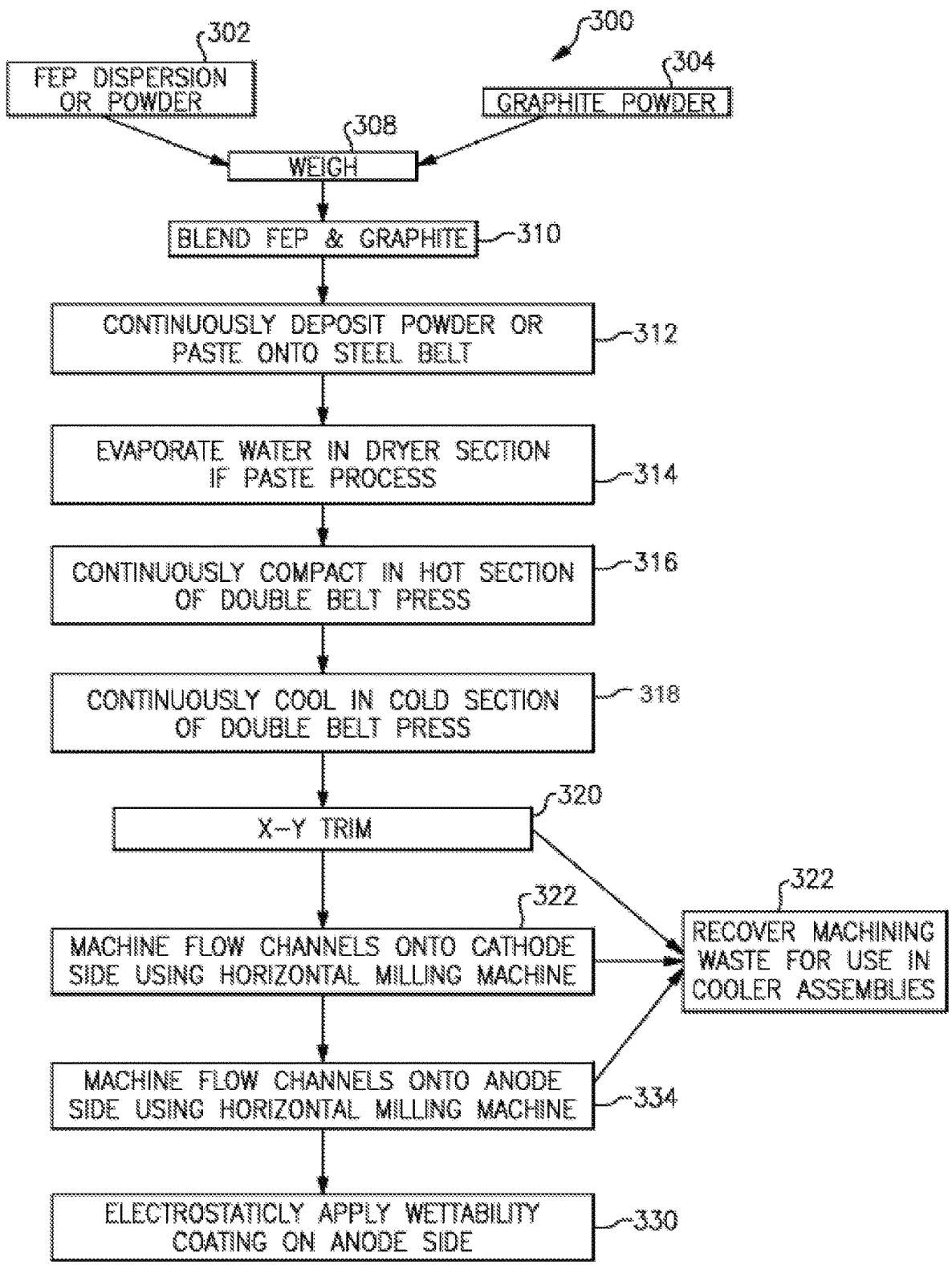
FIG. 9 is a flow chart depicting an example process of continuously forming a bipolar plate blank using a double belt press.

Methods of manufacturing flow field plates using a double belt press are shown in FIGS. 8 and 9. The embodiment shown in FIG. 8 produces a flow field plate to net shape using a double belt press process. It may be desirable to instead form a flow field plate blank and machine flow field channels into the blank. The embodiment shown in FIG. 9 produces a blank that is subsequently machined on both sides to produce the finished separator plate assembly.

Figure 10:
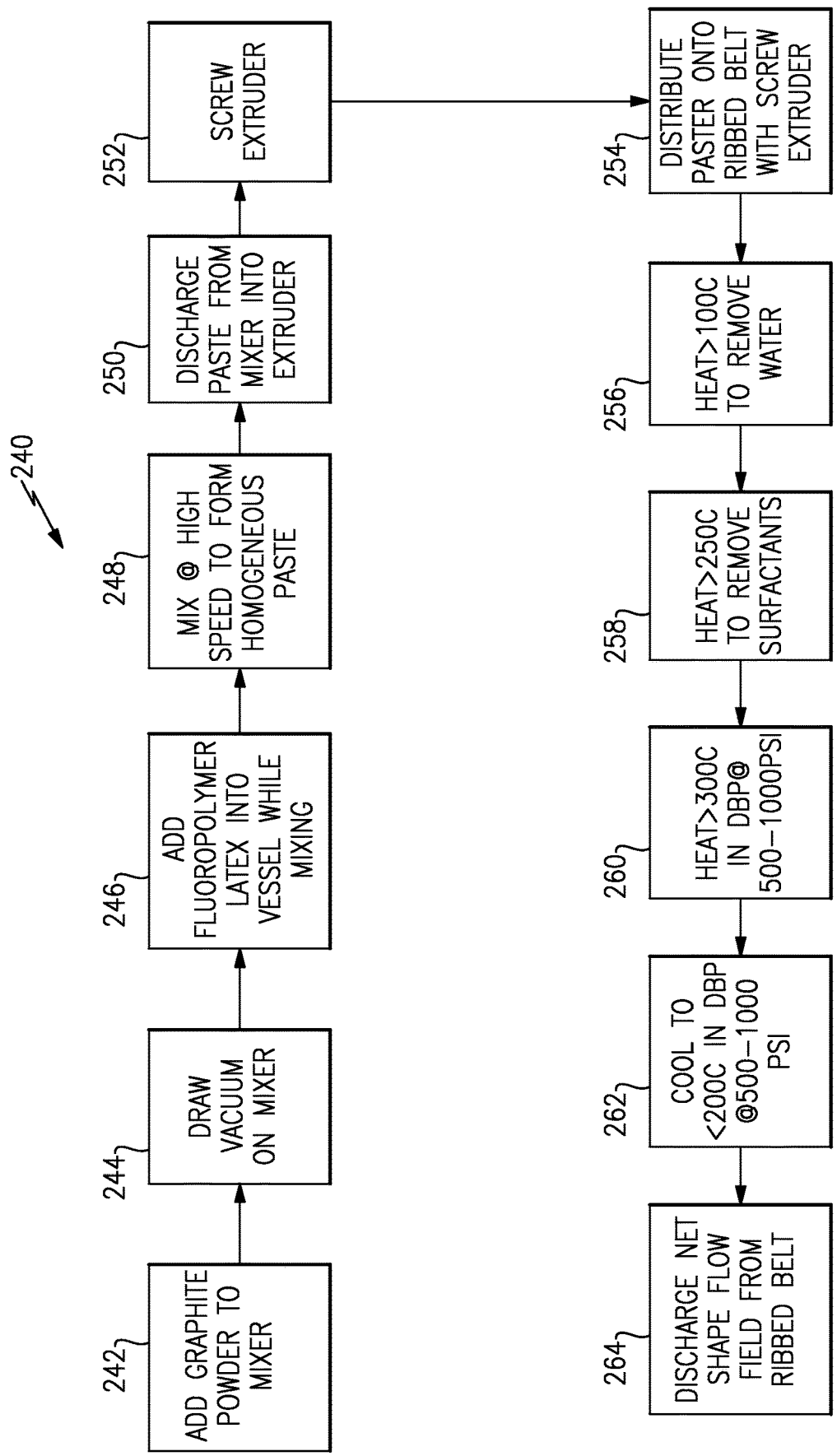
FIG. 10 is a flow chart depicting a paste extrusion sequence and flow field plate formation using the double belt press process of FIGS. 8 and 9.

Referring to FIG. 8, a flow field forming process 200 is shown in which the flow field channels are integrally formed. A paste extrusion process for filling the channels in a steel belt may be used to form a graphite-FEP flow field to net shape. The graphite flakes used to make these flow fields has a very low DBP (e.g., dibutyl phthalate) oil absorption number of about 10 g per 100 g. A standard relating to oil absorption numbers and methods of testing the same is set forth in ASTM D2414. This means that a very small amount of vehicle is required to wet-out the graphite flakes and to produce as viscous paste. In one example, a paste can be made with about 20% water and 80% graphite-FEP. Hydrocarbon liquids that can be vaporized below 200-250° C. may also be used as the vehicle to produce a paste. The specific gravity of such a paste is about 1.7 g/mL. FIG. 10 outlines a process 240 used to prepare such a paste. The compression ratio for the paste is about 1.26 (2.15/1.70) versus 3.3 (2.15/0.65) for the dry process. The compression ratio is the ratio of the density of the molded plate to the density of the dried paste or the bulk density of a powder blend that is used to make the plate. The lower compression ratio will minimize the difference in density between the web and ribs in the molded plate.

Figure 12A:
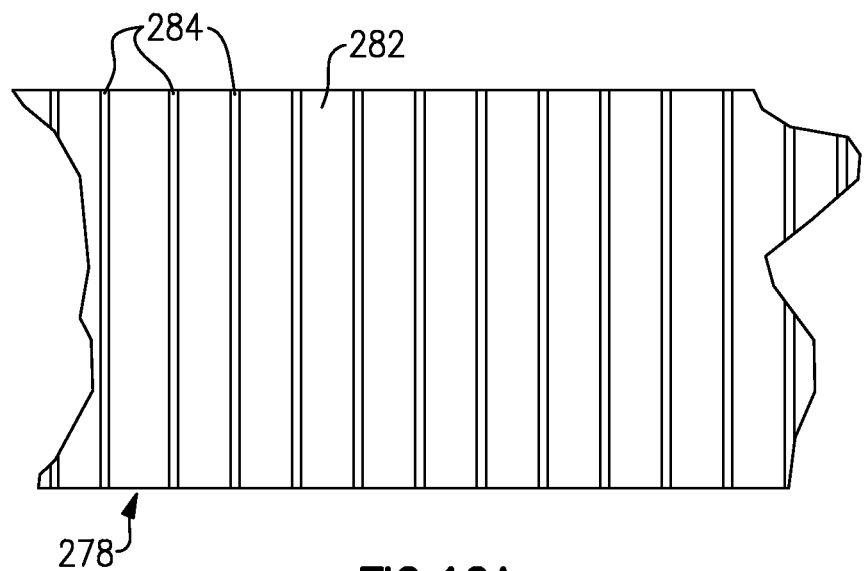
FIG. 12A is a top elevational view of a belt for the machine shown in FIG. 11.
Figure 12B:
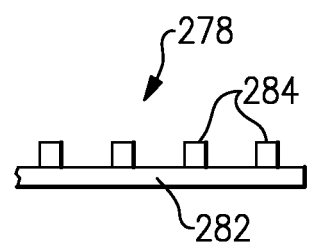
FIG. 12B is a side elevational view of the belt shown in FIG. 12A.

Referring to FIG. 8, a mixture of FEP 202, flake graphite powder 204 and up to about 20% water 206 by volume is prepared to form a paste. The ratio of flake graphite powder to resin is about 4:1. The paste is weighed 208 and blended 210 prior to extrusion onto a conveyor belt, as indicated at 212. In one example, as shown in FIGS. 12A and 12B, the belt 278 is provided by a continuous steel belt 282 having ridges 284, which provide corresponding flow field channels in the flow field plate. Water is evaporated from the paste, as indicated at 214, before being pressed by a double belt arrangement, as indicated at 216. The mixture is heated under pressure and then cooled under pressure, as indicated at 218. The continuous flow field is separated and cut into discrete flow field plates, as indicated at 220. Flow field plates from another line are cut, as indicated at 226, and joined to another flow field plate by a fluoroelastomer, as indicated at 224, and run through a laminator, as indicated at 228. Any waste from cutting can be recovered and reused, as indicated at 222. A wettability coating is electrostatically applied to the anode side, as indicated at 230.

Figure 11:
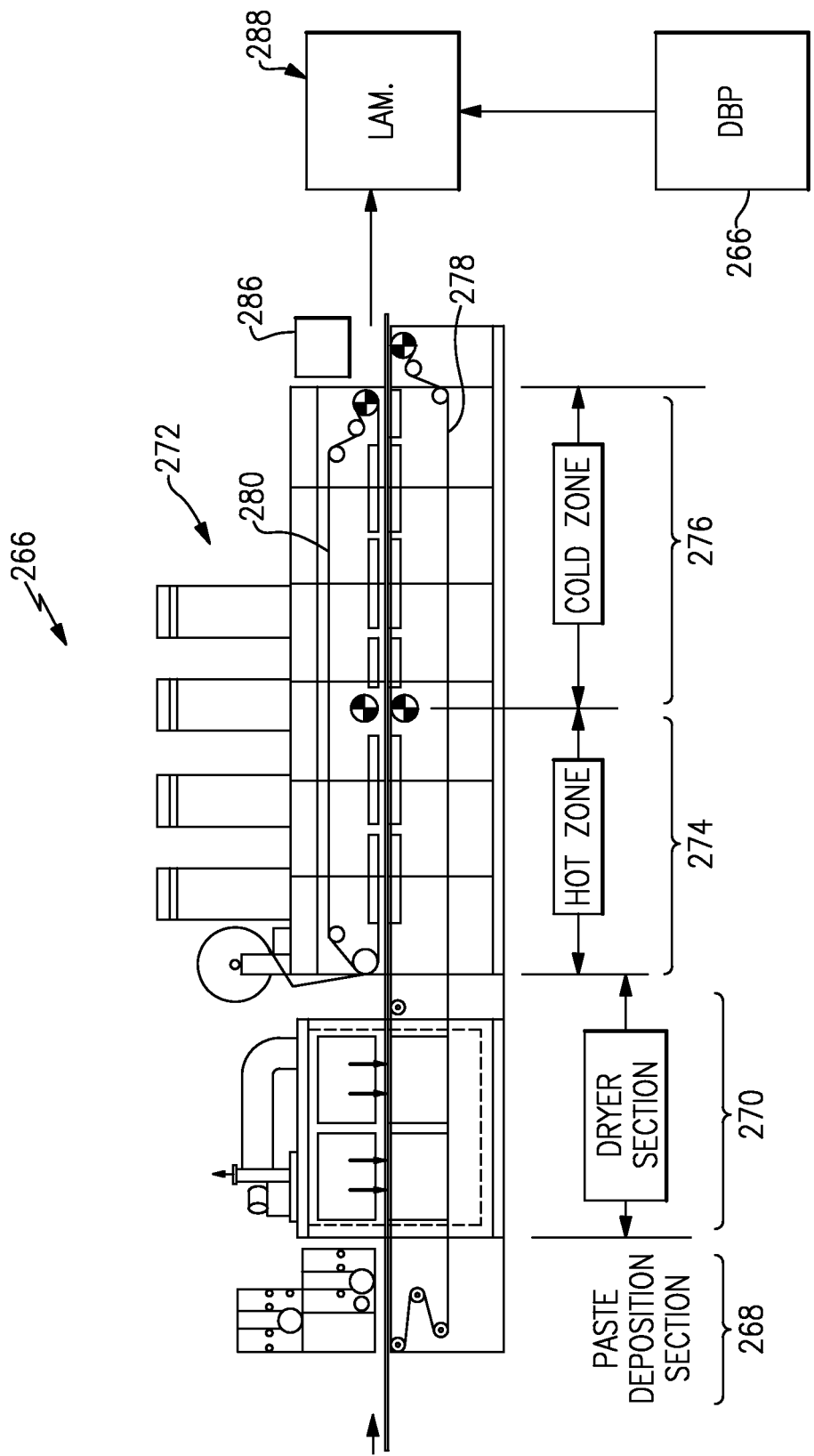
FIG. 11 is a schematic depiction of a double belt press having paste distribution and dryer zones.

FIGS. 10 and 11 respectively depict a paste extrusion process 240 and a double belt press machine 266 that may be used in the process 200. Graphite is added to a mixer 268 (FIG. 11), as indicated at 242 (FIG. 10). A vacuum is drawn on the mixer filled with graphite, as indicated at 244, which aides in wet-out of graphite and removes air bubbles. The mixer is configured such that the flakes are not broken. One example flake graphite is Superior SGC-2901G. A fluoropolymer latex, such as PTFE, is added to the mixer before the vacuum is released while mixing, as indicated at 246. FEP latex may also be used, such as a dispersion of Dyneon FEP 6300GZ. The latex may be cooled during mixing to about 7° C. (45° F.) to ensure that the mixture is free flowing. A homogeneous mix is formed during high speed mixing, as indicated at 248, to produce a paste. The paste is supplied to an extruder (268, FIG. 11), as indicated at 250. The screw extruder 252 distributes the paste onto the belt (278, FIG. 11), as indicated at 254.

The belt 278 containing the paste passes through a dryer section 270, as shown in FIG. 11. The dryer section 270 removes water at above 100° C. (212° F.) and surfactants at above 250° C. (482° F.), as indicated at 256, 258 in FIG. 10. The heated mixture enters a double belted press 272 having lower and upper belts, 278, 280. One or more of the belts, for example, the lower belt, may include ribs that form the flow field channels during pressing.

Returning to FIG. 10, the mixture is heated to above 300° C. (572° F.) under 3.5-7.0 MPa (500-1000 psi), as indicated at 260, in hot zone 274 (FIG. 11). The mixture is maintained under pressure and cooled to less than 200° C., as indicated at 262, in cold zone 276 (FIG. 11). The continuous flow field plate is formed having a net shape thickness and width, as indicated at 264, and may be separated into discrete flow field plates by a cutter 286 (FIG. 11). The formed flow field is ejected from the double belt at about 200° C. (415° F.) which is below the temperature where most of the FEP has solidified, which results in desired physical properties, such as a density of 2.1-2.2 g/mL is the desired range. Another machine 266 may feed a flow field plate to a laminator 288 where it is joined with another plate in a manner previously described.

Referring to FIG. 9, a flow field forming process 300 is shown in which a flow field blank is produced. A mixture of FEP 302 and flake graphite powder 304 and water is mixed. The mixture is weighed 308 and blended 310 prior to depositing onto a belt, as indicated at 312. The belt may be provided as part of a double belt press system. The double belt press system is similar to that shown in FIGS. 12A and 12B but without the ridges used to form the flow field channels. In the example, water is not mixed with the FEP and graphite to make a paste. However, if a paste is used in the process 300, water is evaporated from the paste, as indicated at 314, before being pressed by a double belt press arrangement, as indicated at 316. The mixture is heated under pressure and then cooled, as indicated at 318.

The continuous flow field is separated and cut into discrete flow field plates, as indicated at 320. After trimming, channels are machined on the cathode and anode sides of the same blank, as indicated respectively at 332 and 334. Any waste from cutting can be recovered and reused, as indicated at 322. A wettability coating is electrostatically applied to the anode side, as indicated at 330. An example double belt press machine 266 may be used to form the graphite-FEP flow field blanks to net shape according to the process described relative to FIG. 9.

The individual flow field plates 62, 162 are formed into a separator plate assembly as shown in FIG. 5B and described above. As shown in FIG. 11, extrusion machines 266, 266 may be used to produce the flow field plates 62, 162. An anode flow field and a cathode flow field are bonded together using a low pressure continuous flat bed laminator 288. The anode flow field is coated with a wettability treatment as is known.

Although example embodiments have been disclosed, a worker of ordinary skill in this art would recognize that certain modifications would come within the scope of the claims. For that reason, the following claims should be studied to determine their true scope and content.

What is claimed is:

1. A method of manufacturing a flow field plate, comprising:
   mixing graphite and resin materials;
   heating the graphite and resin materials to provide a molten graphite and resin mixture;
   forming the molten graphite and resin mixture into a continuous flow field plate, the forming including extruding the molten graphite and resin mixture through a die to net shape, the extruding the molten graphite and resin mixture through the die to net shape including providing flow field channels in the continuous flow field plate during the extruding via ribs and channels of a profile of the die, wherein during the forming, the resin material has a liquid to solid phase ratio between 40:60 and 60:40 at an exit of the die; and
   separating the continuous flow field plate into discrete flow field plates having the flow field channels.

2. The method according to claim 1, wherein the graphite material includes a flake graphite powder and the resin material includes at least one of: a fluorinated ethylene propylene, a perfluoroalkoxy copolymer, and polytetrafluoroethylene.

3. The method according to claim 1, wherein the separating includes cutting the continuous flow field plate into the discrete flow field plates.

4. The method according to claim 1, comprising laminating two of the discrete flow field plates to one another to produce a separator plate assembly.

5. The method according to claim 4, wherein the laminating includes adhering the two of the discrete flow field plates to one another with a fluoroelastomer.

6. The method according to claim 1, wherein the extruding includes depositing the graphite and resin materials into a barrel and slidably translating a ram through the barrel to force the molten graphite and resin mixture through the die.

7. The method according to claim 6, wherein the slidably translating occurs without rotating the ram about an axis of the ram.

8. The method according to claim 1 wherein extruding the molten graphite and resin mixture through the die includes extruding the molten graphite and resin mixture through the die with the die located at an exit of an extruder, a length of the die occupying between $\frac{1}{3}$ and $\frac{1}{4}$ of a length of the extruder.

9. The method according to claim 8 wherein the forming includes forming the molten graphite and resin mixture into the continuous flow field plate without passing the molten graphite and resin mixture through a heat barrier.

10. The method according to claim 1 wherein the heating includes heating with an extruder having a length including a first portion, a second portion, and a third portion, the heating including providing an increasing temperature profile along the first portion from 150 degrees Celsius to 350 degrees Celsius, maintaining a temperature of the second portion at 350 degree Celsius along the second portion, and providing a decreasing temperature profile along the third portion from 350 degrees Celsius to 250 degrees Celsius.

11. The method according to claim 10 wherein the first portion comprises $\frac{1}{4}$ of the length of the extruder, the second portion comprises $\frac{1}{2}$ of the length of the extruder, and the third portion comprises $\frac{1}{4}$ of the length of the extruder.

12. The method according to claim 11 wherein the extruding the molten graphite and resin mixture through the die includes extruding the molten graphite and resin mixture through the die with the die located at an exit of the extruder, a length of the die occupying between $\frac{1}{3}$ and $\frac{1}{4}$ of the length of the extruder.

13. The method according to claim 1 wherein the forming includes forming the molten graphite and resin mixture into the continuous flow field plate without passing the molten graphite and resin mixture through a heat barrier.

14. A method of manufacturing a flow field plate, comprising:

mixing graphite and resin materials;

feeding the graphite and resin materials into an extruder having a length including a first portion comprising ¼ of the length of the extruder, a second portion comprising ½ of the length of the extruder, and a third portion comprising ¼ of the length of the extruder;

heating the graphite and resin materials to provide a molten graphite and resin mixture in the extruder, the heating including providing an increasing temperature profile from 150 degrees Celsius to 350 degrees Celsius along the first portion, maintaining a flow field temperature of 350 degree Celsius along the second portion, and providing a decreasing temperature profile from 350 degrees Celsius to 250 degrees Celsius along the third portion;

forming the molten graphite and resin mixture into a continuous flow field plate, the forming including extruding the molten graphite and resin mixture through a die, wherein the extruding includes forming flow field channels in the continuous flow field plate with channels and ribs of the die, the die located at an exit of the extruder and having a die length, the die length being ⅓ of the length of the extruder and including the third portion and part of the second portion to provide a decreasing temperature profile along a portion of the die from 350 degrees Celsius to 250 degrees Celsius, wherein during the forming, the resin material has a liquid to solid phase ratio between 40:60 and 60:40 at an exit of the die; and separating the continuous flow field plate into discrete flow field plates.

15. A method of manufacturing a flow field plate, comprising:

mixing flake graphite and fluorinated ethylene propylene resin materials;

feeding the flake graphite and fluorinated ethylene propylene resin materials into an extruder having a length including a first portion comprising ¼ of the length of the extruder, a second portion comprising ½ of the length of the extruder, and a third portion comprising ¼ of the length of the extruder, the feeding including providing a discontinuous material feed to the extruder;

cooling the flake graphite and fluorinated ethylene propylene resin materials proximate an entrance of a barrel of the extruder;

heating the flake graphite and fluorinated ethylene propylene resin materials to provide a molten graphite and resin mixture in the barrel of the extruder, the heating including providing an increasing temperature profile along the first portion, maintaining a temperature along the second portion that is a melting point of the fluorinated ethylene propylene resin, and providing a decreasing temperature profile along the third portion;

forming the molten graphite and resin mixture into a continuous flow field plate from the discontinuous material feed, the forming including extruding the molten graphite and resin mixture through a die at an exit of the extruder, the die having a die length that is ⅓ of the length of the extruder such that the die has the maintained temperature along a first region and the decreasing temperature profile along a second region, the forming further including forming flow field channels in the continuous flow field plate during the extruding via ribs and channels of the die, wherein the extruding further includes depositing the flake graphite and fluorinated ethylene propylene resin materials into the barrel of the extruder and slidably translating a ram through the barrel without rotating the ram about an axis of the ram to force the molten graphite and resin mixture through the die and, wherein during the forming, the resin material has a liquid to solid phase ratio between 40:60 and 60:40 at an exit of the die; and separating the continuous flow field plate into discrete flow field plates.

\* \* \* \* \*

UNITED STATES PATENT AND TRADEMARK OFFICE
CERTIFICATE OF CORRECTION

PATENT NO. : 10,766,173 B2  
APPLICATION NO. : 14/370468  
DATED : September 8, 2020  
INVENTOR(S) : Richard Breault et al.

Page 1 of 1

It is certified that error appears in the above-identified patent and that said Letters Patent is hereby corrected as shown below:

In the Claims

Column 8, Claim 6, Line 32:
"the graphite and resin materials" should read, --the molten graphite and resin materials--.

Column 8, Claim 8, Line 38:
"wherein extruding the molten" should read, --wherein the extruding the molten--.

Column 10, Claim 15, Line 16:
"that is a melting point" should read, --that is above a melting point--.

Column 10, Claim 15, Line 34:
"the die and, wherein" should read, --the die, and wherein--.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*